United States Patent
Topp et al.

(10) Patent No.: US 10,384,689 B2
(45) Date of Patent: Aug. 20, 2019

(54) METHOD FOR OPERATING A CONTROL UNIT

(71) Applicant: Robert Bosch GmbH, Stuttgart (DE)

(72) Inventors: Jaroslaw Topp, Rennington (DE);
Dieter Thoss, Schwieberdingen (DE);
Margit Mueller, Asperg (DE); Thomas Hartgen, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 250 days.

(21) Appl. No.: 15/617,610

(22) Filed: Jun. 8, 2017

(65) Prior Publication Data

US 2017/0361852 A1 Dec. 21, 2017

(30) Foreign Application Priority Data

Jun. 20, 2016 (DE) .................. 10 2016 210 984

(51) Int. Cl.
*G06F 11/00* (2006.01)
*B60W 50/02* (2012.01)
*G06F 11/22* (2006.01)
*G06F 11/26* (2006.01)

(52) U.S. Cl.
CPC ..... *B60W 50/0205* (2013.01); *G06F 11/2242* (2013.01); *G06F 11/26* (2013.01); *B60W 2050/021* (2013.01)

(58) Field of Classification Search
CPC .............. G06F 11/263; G06F 11/2236; G06F 11/2242; G06F 11/2736; G06F 11/0703
See application file for complete search history.

(56) References Cited

U.S. PATENT DOCUMENTS

| 6,011,921 A * | 1/2000 | Takahashi | G06F 13/24 709/202 |
| 6,523,126 B1 * | 2/2003 | Brabenac | G06F 1/3209 340/3.1 |
| 2002/0194551 A1 * | 12/2002 | Mueller | F02D 41/2493 714/48 |
| 2007/0025347 A1 * | 2/2007 | Cohen | H04L 67/025 370/389 |
| 2008/0243471 A1 * | 10/2008 | Nemecek | G06F 11/261 703/28 |
| 2009/0240979 A1 * | 9/2009 | Campini | G06F 11/0724 714/11 |
| 2012/0110388 A1 * | 5/2012 | Lavery | G06F 11/0721 714/47.1 |
| 2012/0265405 A1 * | 10/2012 | Matsumura | B60W 50/0225 701/45 |

(Continued)

FOREIGN PATENT DOCUMENTS

| DE | 4438714 A1 | 5/1996 |
| DE | 10113917 A1 | 9/2002 |
| DE | 10331872 A1 | 2/2005 |

*Primary Examiner* — Bryce P Bonzo
*Assistant Examiner* — Jeison C Arcos
(74) *Attorney, Agent, or Firm* — Norton Rose Fulbright US LLP; Gerard Messina

(57) ABSTRACT

A method for operating a control unit of a motor vehicle. A status inquiry is transmitted by a watchdog unit to a first monitoring unit, which is implemented on a first processor core of a multicore processor. A status response is ascertained by the first monitoring unit as a function of the status inquiry. A fault is ascertained by the watchdog unit as a function of the status response.

12 Claims, 4 Drawing Sheets

(56) References Cited

U.S. PATENT DOCUMENTS

| | | | |
|---|---|---|---|
| 2013/0242749 A1* | 9/2013 | Herz | G06F 11/0745 370/241 |
| 2016/0124853 A1* | 5/2016 | Roettgermann | G06F 11/0739 711/118 |
| 2017/0293516 A1* | 10/2017 | Baca | G06F 11/079 |
| 2018/0105183 A1* | 4/2018 | Kollmer | B60W 50/0205 |

* cited by examiner

US 10,384,689 B2

METHOD FOR OPERATING A CONTROL UNIT

CROSS REFERENCE

The present application claims the benefit under 35 U.S.C. § 119 of German Patent Application No. DE 102016210984.7 filed on Jun. 20, 2016, which is expressly incorporated herein by reference in its entirety.

FIELD

The present invention relates to a method for operating a control unit, as well as to a control unit.

BACKGROUND INFORMATION

So-called watchdog units, which monitor the execution of software on a microcontroller of a control unit for a motor vehicle, are widely available. A status inquiry is transmitted by the watchdog unit to a first monitoring unit, which is implemented, for example, on a first processor core of a multicore processor. A status response is ascertained by the first monitoring unit as a function of the status inquiry. A fault is ascertained by the watchdog unit as a function of the status response.

In addition, the conventional so-called three-layer concept makes possible reliable operation of a control unit of a motor vehicle with high availability and simultaneously low degree of complexity and, therefore, low costs.

A method for controlling a drive unit of a vehicle is described in German Patent No. DE 44 38 714 A1. Only a single computing element (microcomputer), which performs both the control and the monitoring, is provided for controlling the power of the drive unit.

A method for monitoring a technical system is described in German Patent Application No. DE 103 31 872 A1. A control-unit-wide software frame, which is implemented in the control units, in particular, in the computing elements of the control units, carries out the monitoring and/or regulation of the application software of the control unit.

German Patent Application No. DE 101 13 917 A1 describes a method for monitoring data and transmitting the data between at least a first and a second control unit. Data acquired by a component are transmitted securely by the first to the second control unit over a single connection. Separate safeguarding of the data and the data transmission in the first and second program levels is carried out in such a manner, that errors in the data and in the data transmission are detected.

SUMMARY

In accordance with example embodiments of the present invention, it is provided that a first test result be ascertained by a first self-testing unit, which is implemented on the first processor core. In addition, a second test result is ascertained by a second self-testing unit, which is implemented on a second processor core of the multicore processor. A third test result is ascertained by a second monitoring unit as a function of the second test result. The status response is ascertained by the first monitoring unit as a function of the first test result, and as a function of the third test result.

By combining the first and the third test results, a solution is advantageously obtained, which is scalable over several processor cores and/or multicore processors and simultaneously ensures a high degree of availability of the entire control unit in a favorable manner. In this manner, in particular, heterogeneous architectures of control units may be provided with a hierarchical watchdog structure. In addition, portability of individual software components of the control units is simplified. In particular, the increased requirements with respect to computing power and with respect to reliability may be satisfied, using the example method and control unit in accordance with the present invention.

Furthermore, with the aid of the second monitoring unit, the processing of the second test result is decoupled from the determination of the status response for the watchdog unit. In this manner, temporal decoupling of the time domains for communication between the watchdog unit and the first monitoring unit, of the time domains for communication between the second monitoring unit and the second self-testing unit, and of the time domains of executed tasks, is rendered possible.

In one advantageous specific embodiment, a fourth test result is ascertained by a third self-testing unit, which is implemented on a third processor core of the multicore processor. The third test result is ascertained by the second monitoring unit as a function of the second test result and as a function of the fourth test result.

In one advantageous specific embodiment, the second test result is compared to a second nominal test result by the second monitoring unit. The fourth test result is compared to a fourth nominal test result by the second monitoring unit. A further fault is ascertained, when the second and/or fourth test result deviates from the respective nominal result. A fault tolerance time (FTTI: failure tolerance time interval) of less than 50 ms, as well as a rapid switching-off time, may be achieved in this manner.

In one advantageous further refinement, the further fault is ascertained by the second monitoring unit, when the second or fourth test result is not available after expiration of a period of time. Consequently, the second monitoring unit also carries out a timeout watchdog function in an advantageous manner.

In one advantageous specific embodiment, the first processor core is operated with the aid of an associated lockstep processor core according to a lockstep method. In this manner, the functional reliability is increased.

In one advantageous specific embodiment, the second monitoring unit is implemented on the first processor core, program execution monitoring is carried out with respect to the implementation of the second monitoring unit, and the first test result includes a result of the program execution monitoring. In this manner, the second monitoring unit is advantageously monitored by the watchdog unit.

In one advantageous specific embodiment, with the aid of a further watchdog unit, which is implemented on the second processor core, a further status inquiry is transmitted to a secondary, first monitoring unit, which is implemented on a secondary, first processor core of a secondary multicore processor. A further status response is ascertained by the secondary, first monitoring unit as a function of the further status inquiry. A further fault is ascertained by the further watchdog unit as a function of the further status response. A secondary, first test result is ascertained by a secondary, first self-testing unit, which is implemented on the secondary, first processor core. A secondary, second test result is ascertained by a secondary, second self-testing unit, which is implemented on a secondary, second processor core of the secondary multicore processor. A secondary, third test result is ascertained by a secondary, second monitoring unit as a function of the secondary, second test result. The secondary status response is ascertained by the secondary, first monitoring unit as a function of the secondary, first test result, and as a function of the secondary, third test result. Further scaling with respect to the secondary multicore processor may advantageously be achieved by this specific embodiment.

In one advantageous further refinement, the second processor core of the multicore processor is operated with the aid of an associated lockstep processor core according to the lockstep method. The secondary, first processor core is operated with the aid of an associated lockstep processor core according to the lockstep method. This further refinement increases the functional reliability.

In one advantageous specific embodiment, the watchdog unit takes the form of a hardware component. In this manner, a cost-effective control unit is provided.

Advantageous specific embodiments and further refinements of the present invention are explained in the following description of the figures. In some instances, the same reference characters are used for functionally equivalent variables and features, independently of their specific embodiment.

DETAILED DESCRIPTION OF EXAMPLE EMBODIMENTS

Figure 1:
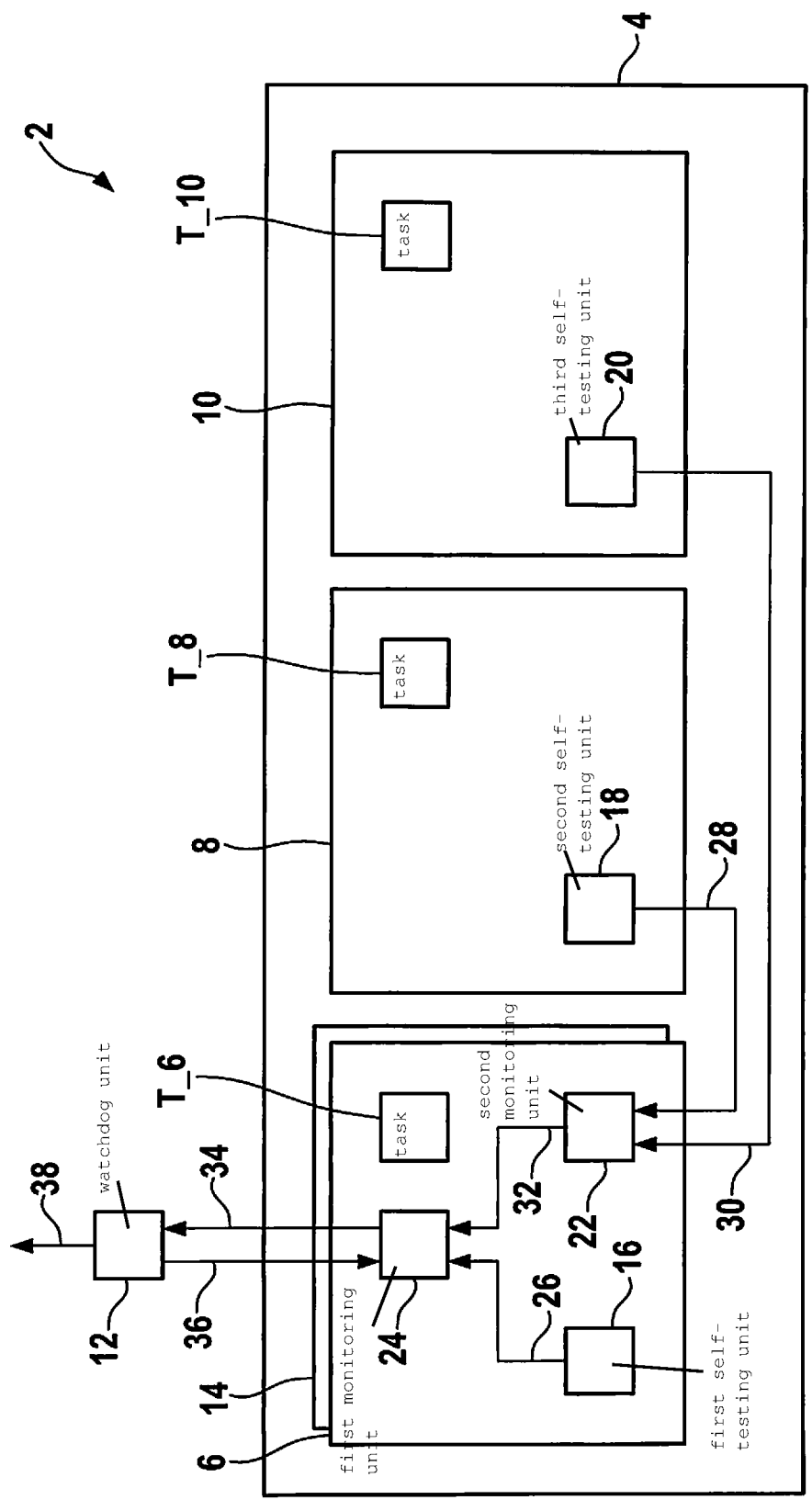
FIGS. 1-3 show, in each instance, a schematic block diagram of a control unit of a motor vehicle.

FIG. 1 shows a schematic block diagram of a control unit 2. A multicore processor 4 includes a first processor core 6, a second processor core 8, and a third processor core 10. Multicore processor 4 is assigned a watchdog unit 12 situated outside of multicore processor 4. In addition, multicore processor 4 includes a lockstep processor core 14, which is configured to process, in redundant form, the input data or instructions supplied to first processor core 6 in accordance with a lockstep method.

In one specific embodiment, first processor core 6 does not work in unison with a lockstep processor core according to the lockstep method. In this context, self-testing unit 16 includes, in addition to program execution monitoring, an additional instruction test in hardware or software form, as well.

Tasks T_6, T_8, and T_10 are executed on processor cores 6, 8, and 10, respectively. Tasks T are, inter alia, processes that are assigned to a control level of the control unit; the specific tasks T performing, for example, calculations that are used for controlling or signaling entities situated outside of control unit 2, such as drive units, display devices, or further control units.

A first self-testing unit 16 is implemented on processor core 6. A second self-testing unit 18 is implemented on processor core 8. A third self-testing unit 20 is implemented on processor core 10. Self-testing units 16, 18, 20 each carry out respective self-tests. For example, in the case of an assigned lockstep processor core 14, these self-tests may be limited to program execution monitoring of the tasks T proceeding there. In the case of a processor core 8 not operating according to the lockstep method, specific self-testing unit 18 includes, in addition to program execution monitoring, an additional instruction test, which may be implemented in hardware or software. Of course, further self-tests are possible, which include, for example, storage tests or the like.

First self-testing unit 16 generates a first test result 26 as a function of an executed self-test. Second self-testing unit 18 generates a second test result 28 as a function of an executed self-test. Third self-testing unit 20 generates a fourth test result 30 as a function of an executed self-test. The two test results 28 and 30 are supplied to a second monitoring unit 22, which combines the two test results 28 and 30 into a third test result 32.

Third test result 32 is supplied, together with first test result 26, to a first monitoring unit 24. First monitoring unit 24 generates a status response 34 as a function of first test result 26 and third test result 32. Status response 34 is ascertained by first monitoring unit 24 in response to a received status inquiry 36, which is generated by watchdog unit 12. Watchdog unit 12 compares received status response 34 to a nominal status response. If status response 34 does not match the nominal status response, then watchdog unit 12 ascertains a fault 38. As a function of fault 38, a fault processing unit not shown may switch off or restart multicore processor 4 or initiate an interrupt. In addition, watchdog unit 12 ascertains fault 38, if a status response 34 is not present within a predefined time window.

In particular, program execution monitoring with respect to the implementation of second monitoring unit 22 is carried out by first self-testing unit 16. Therefore, first test result 26 includes a result of the program execution monitoring. First monitoring unit 24 preferably ascertains status response 34 via an exclusive OR operation (XOR) of the supplied test results, such as test results 26 and 32. In a form not shown, first monitoring unit 24 may also be supplied second and/or fourth test results 28, 30.

Figure 2:
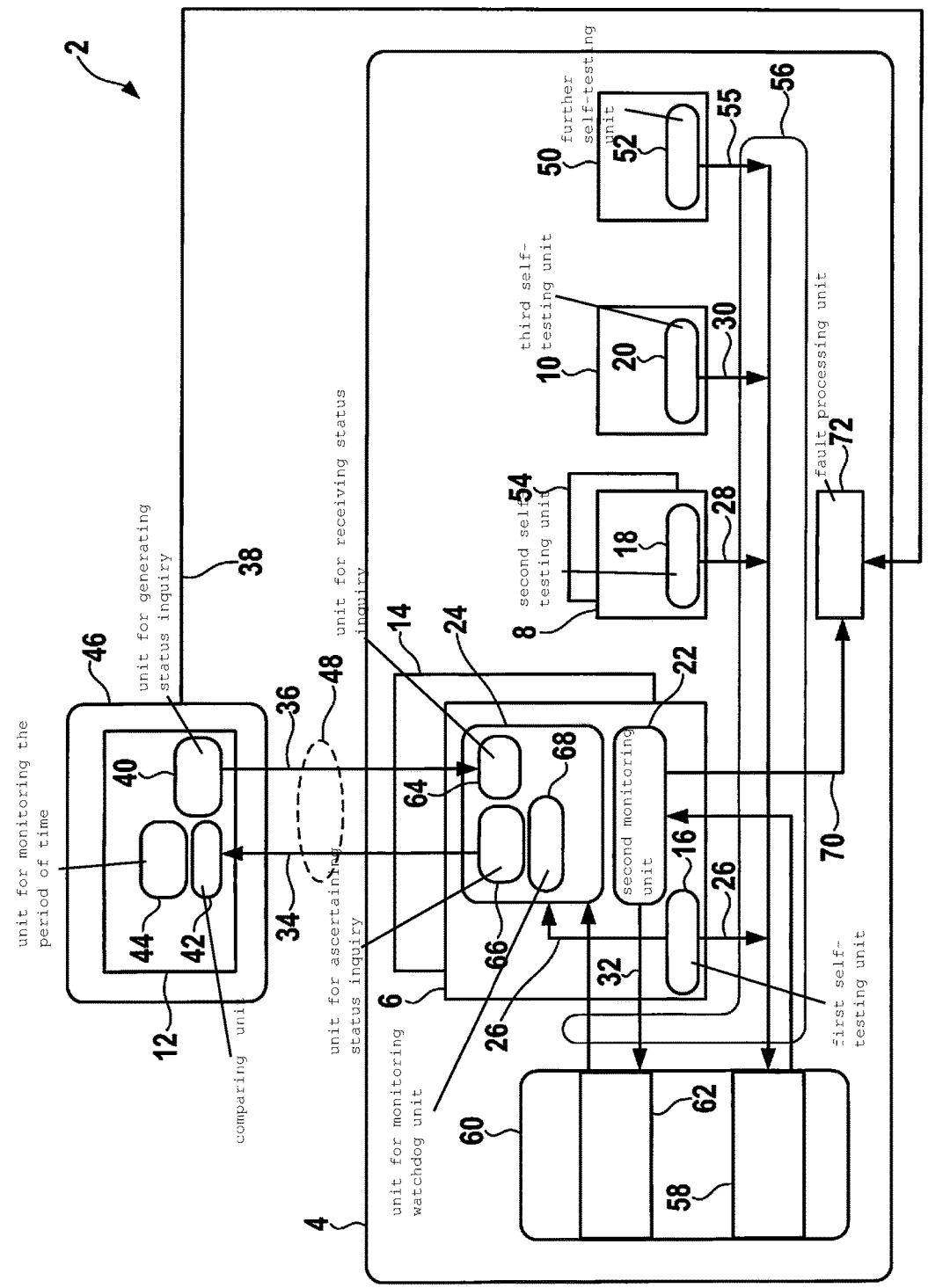

FIG. 2 shows a schematic block diagram of a further specific embodiment of control unit 2. Watchdog unit 12 includes a unit 40 for generating status inquiry 36, a unit 42 for comparing received status response 34 to the nominal status response, as well as a unit 44 for monitoring the period of time, at the end of which status response 34 must be present if no fault is to be triggered. Watchdog unit 12 is preferably implemented in the form of a hardware component 46, for example, as a part of an ASIC (application specific integrated circuit). Status inquiry 36 and status response 34 are transmitted between multicore processor 4 and hardware component 46 with the aid of a bus system 48, for example, with the aid of an SPI bus system (SPI: serial peripheral interface).

Multicore processor 4 may include further processor cores, such as processor core 50, which includes a further self-testing unit 52. Presently, second processor core 8 is operated with the aid of an associated lockstep processor core 54 according to the lockstep method. Self-testing units 16, 18, 20 and 52 transmit respective test results 26, 28, 30 and 55 via a data bus 56 into a first storage area 58 of a memory 60 of multicore processor 4. Second monitoring unit 22 exercises read access to first storage area 58. Second monitoring unit 22 ascertains third test result 32 and writes third test result 32 into a second storage area 62 of memory 60 via data bus 56.

First monitoring unit 24 includes a unit 64 for receiving status inquiry 36, a unit 66 for ascertaining status inquiry 34, as well as a unit 68 for monitoring watchdog unit 12. Second monitoring unit 22 ascertains a further fault 70, which is supplied to a fault processing unit 72. Fault 38 is also supplied to fault processing unit 72. Depending on further fault 70 and depending on fault 38, fault processing unit 72 may switch off output stages belonging to multicore processor 4, initiate a reset of multicore processor 4, as well as trigger an interrupt for multicore processor 4. Further fault 70 is ascertained by second monitoring unit 22, when one of the test results 26, 28, 30, or 55 stored in first storage area 58 deviates from a corresponding, nominal test result or a time period for providing specific test result 26, 28, 30, or 55 has expired.

Figure 3:
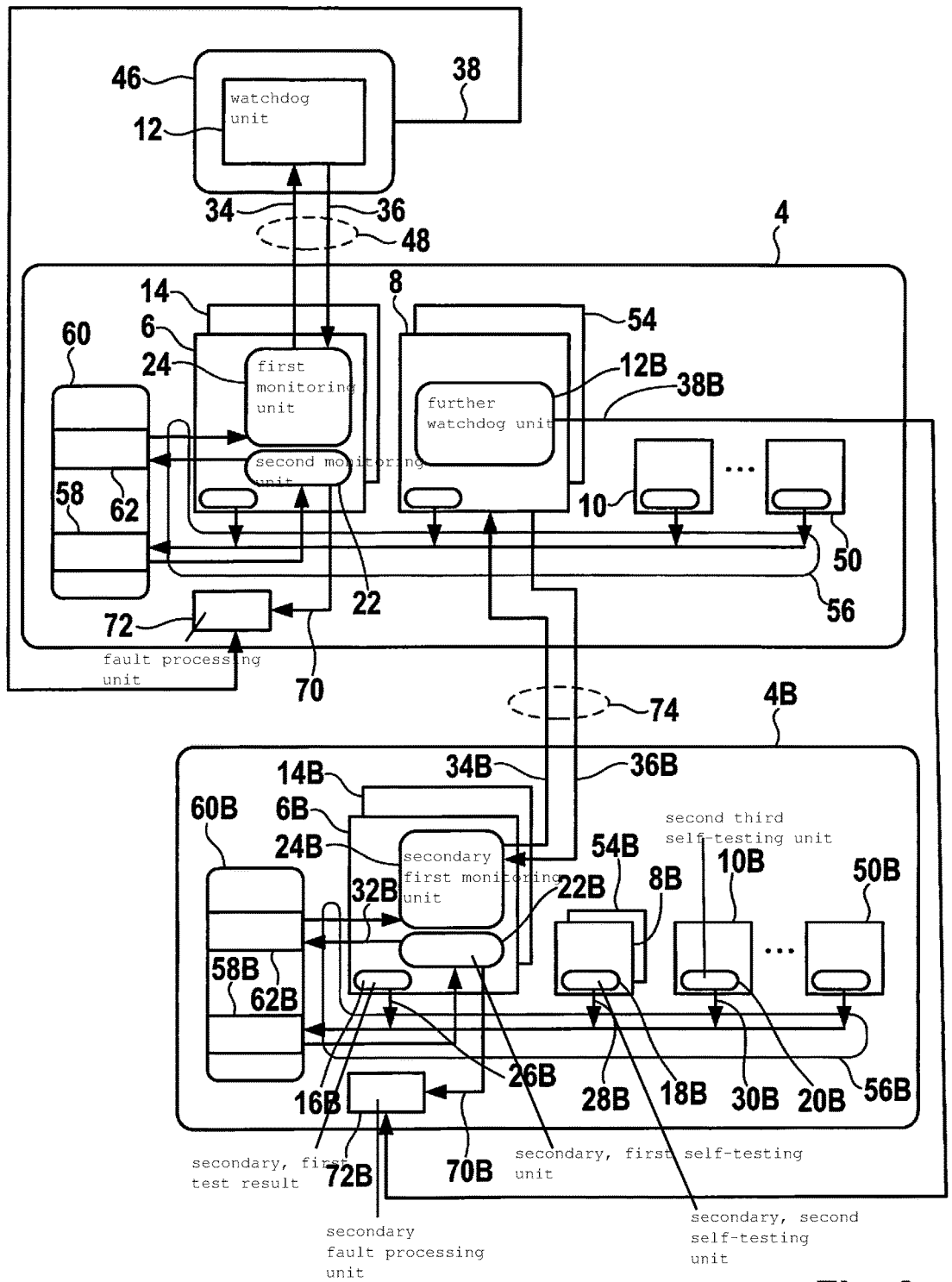

FIG. 3 shows a schematic block diagram of a further specific embodiment of control unit 2. In contrast to FIG. 2, control unit 2 includes a secondary multicore processor 4B, which, for example, may be constructed and configured analogously to multicore processor 4. Of course, secondary multicore processor 4B may also vary in its configuration. A further watchdog unit 12B is implemented on second processor core 8 in the form of a software module. Further watchdog unit 12B essentially includes the same functions as watchdog unit 12, which is manufactured as a hardware component 46. Further watchdog unit 12B generates a further status inquiry 36B, which is transmitted to a secondary, first monitoring unit 24B with the aid of a data bus 74, which may be constructed, for example, as a UART bus (UART: universal asynchronous receiver transmitter); the secondary, first monitoring unit being implemented on a secondary, first processor core 6B. A further status response 34B is ascertained by secondary, first monitoring unit 24B as a function of further status inquiry 36B. Further watchdog unit 12B ascertains a further fault 38B as a function of further status response 34B. Fault 38B is supplied to secondary fault processing unit 72B via a hardware pin.

A secondary, first self-testing unit 22B ascertains a secondary, first test result 16B. A secondary, second test result 28B is transmitted by a secondary, second self-testing unit 18. A secondary, fourth test result 30B is ascertained by a secondary, third self-testing unit 20B. Secondary, second monitoring unit 22B ascertains a secondary, third test result 32B as a function of secondary, second and secondary, fourth test results 28B, 30B. Secondary status response 34B is ascertained by secondary, first monitoring unit 24B as a function of secondary, first test result 26B, and as a function of secondary, third test result 32B. Second processor core 8 of multicore processor 4 is operated with the aid of associated lockstep processor core 54 according to the lockstep method. Secondary, first processor core 6B of secondary multicore processor 4B is operated with the aid of an associated lockstep processor core 14B according to the lockstep method.

Of course, instances of broadening the principle shown in FIG. 3 are possible. Thus, for example, to the extent that processor cores 10 and 50 operate with the aid of an associated lockstep processor core according to a lockstep method, they may include further watchdog units constructed as software modules in a manner analogous to further watchdog unit 12B, in order to integrate further multicore processors into the watchdog method explained here. Of course, secondary, second processor core 8B may also include a further, secondary watchdog unit for implementation. It is explicitly pointed out that the word choice, "secondary," in reference to secondary multicore processor 4B and its components is used, first and foremost, for verbal differentiation.

Figure 4:
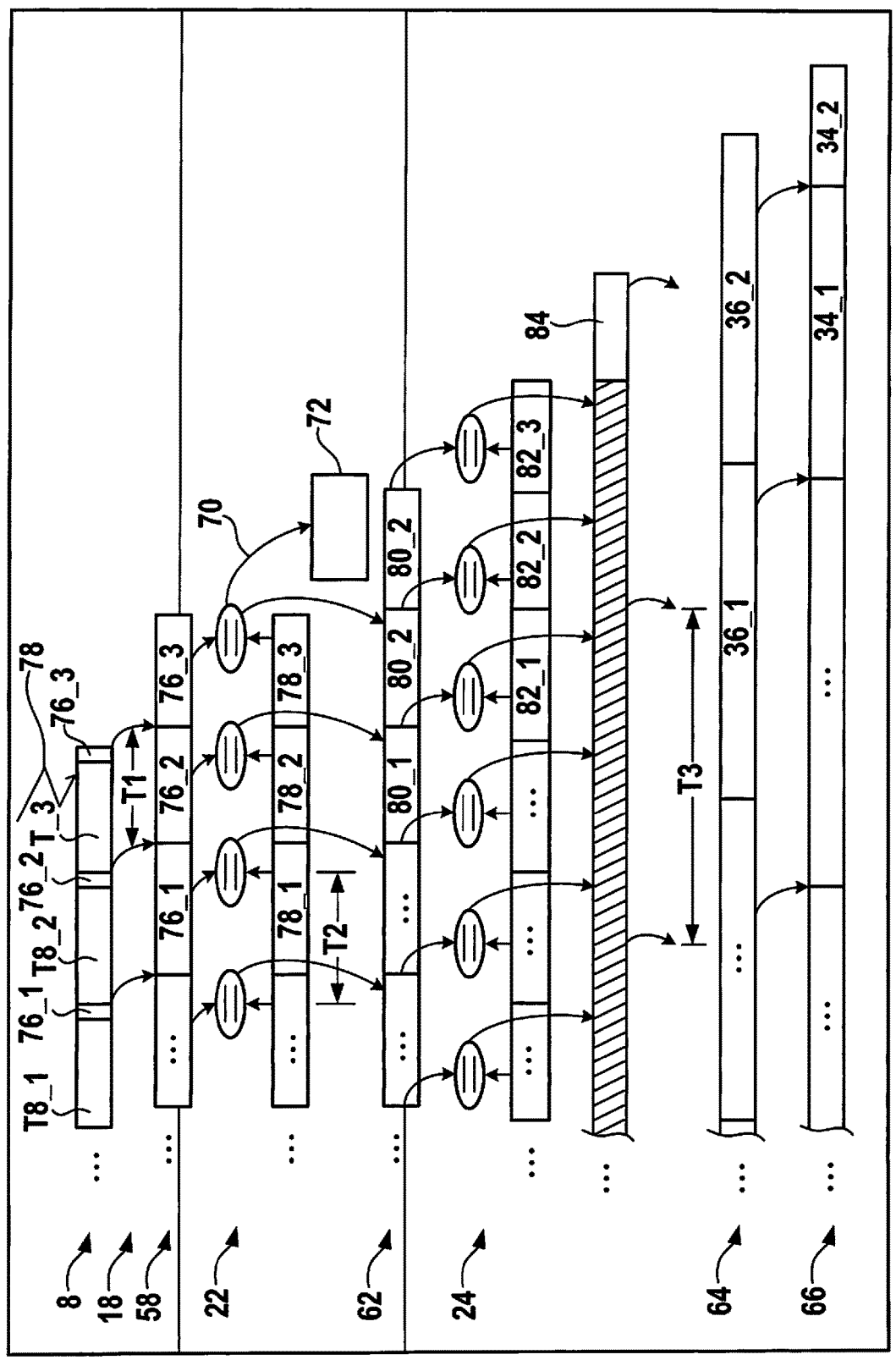
FIG. 4 shows a schematic execution of fault detection.

FIG. 4 shows a schematic view of execution of fault detection. By way of example, temporal execution of tasks T8_1, T8_2 and T8_3 on second processor core 8 is shown. The self-testing unit 18 assigned to second computation unit 8 carries out, for example, program execution monitoring with regard to the individual tasks and generates a corresponding signature 76_1, 76_2, and 76_3. A fault 78, which is reflected in signature 76_3, occurs during the execution of tasks T_3. Signatures 76 are stored in first storage area 58. Signatures 76 correspond to second test result 28.

Second monitoring unit 22 performs checks of signatures 76, using expected nominal signatures 78. Ascertained signature 76_3 deviates from nominal signature 78_3, for which reason second monitoring unit 22 ascertains further fault 70 and transmits this further fault 70 to fault processing unit 72.

If signature 76 and nominal signature 78 match during the comparison carried out by second monitoring unit 22, then a sequence number 80 is incremented. When signature 76_3 and nominal signature 78_3 do not agree, sequence number 80_2 is not incremented and has the same value in the follow-up state.

Counter 80 corresponds to third test result 32, which is stored in second storage area 62. Of course, as an alternative to the provided sequence numbers 80, a different type of linking of signatures 76 may be provided. For example, the signatures 76, which are supplied to second monitoring unit 22, may be combined by an exclusive OR gate to form third test result 32.

First monitoring unit 24 carries out a comparison of sequence number 80 and a nominal sequence number 82. If nominal sequence number 82_3 is expected, but a non-incremented sequence number 82_2 is read, then a switch into a fault state 84 is made. Unit 64 of first monitoring unit 24 receives status inquiry 36_2. In light of ascertained fault state 84, unit 66 of first monitoring unit 24 generates a status response 34_2, which indicates a fault state of multicore processor 4 to watchdog unit 12. In addition, status response 34_2 may be transferred to fault processing unit 72.

Each of processor cores 6, 8 and 10 writes a signature 76, that is, a specific test result 26-30, to first storage area 58 at a regular time interval T1. Second monitoring unit 22 carries out its check test at a time interval T2, which may be less than or equal to time interval T1. First monitoring unit 24 transmits status response 34 to associated watchdog unit 12 at a regular time interval T3, which is greater than time interval T2. In addition, time interval T2 is less than a stipulated fault tolerance interval (FTTI). Of course, other relations of time intervals T1, T2 and T3 to one another are also possible. The temporal decoupling of the time intervals is achieved by the provision of monitoring units 22 and 24.

What is claimed is:

1. A method for operating a control unit of a motor vehicle, comprising:
    transmitting a status inquiry by a watchdog unit to a first monitoring unit, which is implemented on a first processor core of a multicore processor;
    ascertaining, by the first monitoring unit, a status response as a function of the status inquiry;
    ascertaining, by the watchdog unit, a fault as a function of the status response;
    ascertaining, by a first self-testing unit, a first test result, the first self-testing unit being implemented on the first processor core;
    ascertaining, by a second self-testing unit, a second test result, the second self-testing unit being implemented on a second processor core of the multicore processor; and
    ascertaining, by a second monitoring unit, a third test result as a function of the second test result; and
    wherein the status response is ascertained by the first monitoring unit as a function of the first test result, and as a function of the third test result.

2. The method as recited in claim 1, further comprising:
ascertaining, by a third self-testing unit, a fourth test result, the third self-testing unit being implemented on a third processor core of the multicore processor;
wherein the third test result is ascertained by the second monitoring unit as a function of the second test result, and as a function of the fourth test result.

3. The method as recited in claim 2, wherein at least one of:
the second test result is compared to a second nominal test result by the second monitoring unit;
the fourth test result is compared to a fourth nominal test result by the second monitoring unit; and
a further fault is ascertained, if at least one of the second test result and fourth test result deviates from at least one of a specific second and third nominal result.

4. The method as recited in claim 3, wherein the further fault is ascertained by the second monitoring unit, when the second or fourth test result is not available after expiration of a period of time.

5. The method as recited in claim 1, wherein the first processor core is operated with the aid of an associated lockstep processor core according to a lockstep method.

6. The method as recited in claim 1, wherein:
the second monitoring unit is implemented on the first processor core;
program execution monitoring is carried out with respect to the implementation of the second monitoring unit; and
the first test result includes a result of the program execution monitoring.

7. The method as recited in claim 1, wherein:
with the aid of a further watchdog unit, which is implemented on the second processor core, a further status inquiry is transmitted to a secondary, first monitoring unit, which is implemented on a secondary, first processor core of a secondary multicore processor;
a further status response is ascertained by the secondary, first monitoring unit as a function of the further status inquiry;
a further fault is ascertained by the further watchdog unit as a function of the further status response;
a secondary, first test result is ascertained by a secondary, first self-testing unit, which is implemented on the secondary, first processor core;
a secondary, second test result is ascertained by a secondary, second self-testing unit, which is implemented on a secondary, second processor core of the secondary multicore processor;
a secondary, third test result is ascertained by a secondary, second monitoring unit as a function of the secondary, second test result; and
the secondary status response is ascertained by the secondary, first monitoring unit as a function of the secondary, first test result, and as a function of the secondary, third test result.

8. The method as recited in claim 7, wherein:
a secondary, fourth test result is ascertained by a secondary, third self-testing unit, which is implemented on a secondary, third processor core of the secondary multicore processor; and
a secondary, third test result is ascertained by a secondary, second monitoring unit as a function of the secondary, second test result, and as a function of the secondary, fourth test result.

9. The method as recited in claim 8, wherein:
the second processor core of the multicore processor is operated with the aid of an associated lockstep processor core according to a lockstep method; and
the secondary, first processor core is operated with the aid of an associated lockstep processor core according to the lockstep method.

10. The method as recited in claim 1, wherein the watchdog unit takes the form of a hardware component.

11. A control unit for a motor vehicle, the control unit designed to:
transmit a status inquiry by a watchdog unit to a first monitoring unit, which is implemented on a first processor core of a multicore processor;
ascertain, by the first monitoring unit, a status response as a function of the status inquiry;
ascertain, by the watchdog unit, a fault as a function of the status response;
wherein:
a first test result is transmitted by a first self-testing unit, which is implementable on the first processor core;
a second test result is transmitted by a second self-testing unit, which is implemented on a second processor core of the multicore processor;
a third test result is ascertained by a second monitoring unit as a function of the second test result; and
the status response is ascertained by the first monitoring unit as a function of the first test result, and as a function of the third test result.

12. The control unit as recited in claim 11, the control unit being designed to:
ascertain, by a third self-testing unit, a fourth test result, the third self-testing unit being implemented on a third processor core of the multicore processor;
wherein the third test result is ascertained by the second monitoring unit as a function of the second test result, and as a function of the fourth test result.

* * * * *